United States Patent [19]

Wetzler

[11] 3,709,659

[45] Jan. 9, 1973

[54] PROCESSING OF DISCRETE ARTICLES WITHOUT JOINING SAME

[75] Inventor: Justin J. Wetzler, Evanston, Ill.

[73] Assignee: F. W. Means Company

[22] Filed: March 22, 1971

[21] Appl. No.: 126,715

Related U.S. Application Data

[63] Continuation-in-part of Ser. No. 826,138, May 20, 1969, Pat. No. 3,571,830.

[52] U.S. Cl. .................................. 8/137, 68/DIG. 5
[51] Int. Cl. ............................................. D06f 35/00
[58] Field of Search....8/137, 149.1, 150, 151, 151.2, 8/154, 155; 68/5 D, 5 E, DIG. 5, 9, 13 R, 19, 20

[56] References Cited

UNITED STATES PATENTS

| 2,736,632 | 2/1956 | Blau | 68/5 E X |
| 3,456,431 | 7/1969 | Fleissner | 68/DIG. 5 |
| 3,465,549 | 9/1969 | Wendt | 68/19 X |

Primary Examiner—Walter A. Scheel
Assistant Examiner—Philip R. Coe
Attorney—Molinare, Allegretti, Newitt & Witcoff et al.

[57] ABSTRACT

A process and apparatus for conditioning discrete articles where the articles to cleanse or otherwise condition the articles for use where the articles are moved through a liquid bath and then passed through a rinse section and a dryer to remove moisture to return the articles to a substantially dry condition and to iron the articles to finished form.

6 Claims, 2 Drawing Figures

PATENTED JAN 9 1973

3,709,659

Inventor
Justin J. Wetzler
By Keith J. Kulie
Attorney

PROCESSING OF DISCRETE ARTICLES WITHOUT JOINING SAME

CROSS REFERENCE TO RELATED APPLICATION

This application is a continuation-in-part of my prior, copending application, Ser. No. 826,138, filed May 20, 1969, now U.S. Pat. No. 3,571,830.

The present invention relates to a method for processing of discrete articles in a substantially continuous manner without physically joining the articles for processing.

The process is particularly adapted for the conditioning of relatively short length articles on a substantially continuous basis without physically joining the articles at any stage during processing.

Many devices have been developed from time-to-time for laundering or otherwise conditioning articles in a form which permits continuous or substantially continuous processing. Some of these devices require physical joining of the individual articles prior to processing to define a continuous chain of material which may be drawn through the apparatus. Other devices require the placement of articles between two conveyor bands to retain them in proper orientation.

When articles are joined in the manner noted above it is necessary, of course, to separate them at a later stage for re-use in their the originally defined form. This involves severing the articles at the joined area in a manner which will not result in damage to the article.

Other processes for laundering or otherwise processing articles contemplate "batch" processing solely, where the articles may be placed in a receptacle in random form and laundered in the receptacle. The articles then are individually withdrawn from the receptacle and processing is continued by drying and pressing the articles or subjecting them to any desired treatment with the articles being individually handled. Such processing involves a significant amount of handling of the articles which in many instances will require significant labor and expense.

It should be noted that devices have been developed which are suitable for processing individual articles of any length in a continuous manner. The specific structural configurations of the devices have taken many different forms, each being suitable for the designed purpose of the device. However, suitable means are not commonly available for use in continuous processing of individual articles without physically joining the articles in some manner.

It is the primary purpose of the present invention to provide a process which is useful in conditioning individual articles without joining them thereby avoiding the joining and separating steps.

It is, accordingly, a general object of the present invention to provide an improved method for processing single articles without physically joining the articles.

Other objects and advantages of the present invention reside in the provision of an apparatus for processing individual articles without physically joining them wherein liquid is caused to move into intimate contact with all articles processed, said articles being processed in a substantially continuous manner; the apparatus being economical to fabricate and to maintain; the process and apparatus being readily adapted for installation and use with conventional auxiliary supply means commonly available; the apparatus being economical to fabricate and to maintain; durable in use, each to use and which is adaptable for use with individual articles of many differing sizes.

The novel features which I believe to be characteristic of my invention are set forth with particularlity in the appended claims. My invention itself, however, together with further objects and advantages thereof will best be understood by reference to the following description taken in connection with the accompanying drawings, in which:

As noted above, the present apparatus is particularly adapted for use in processing single articles along a substantially continuous processing line without physically joining the articles. Items of the type contemplated above could include table napkins, hand towels, table cloths, bed sheets, or the like.

Figure 1:
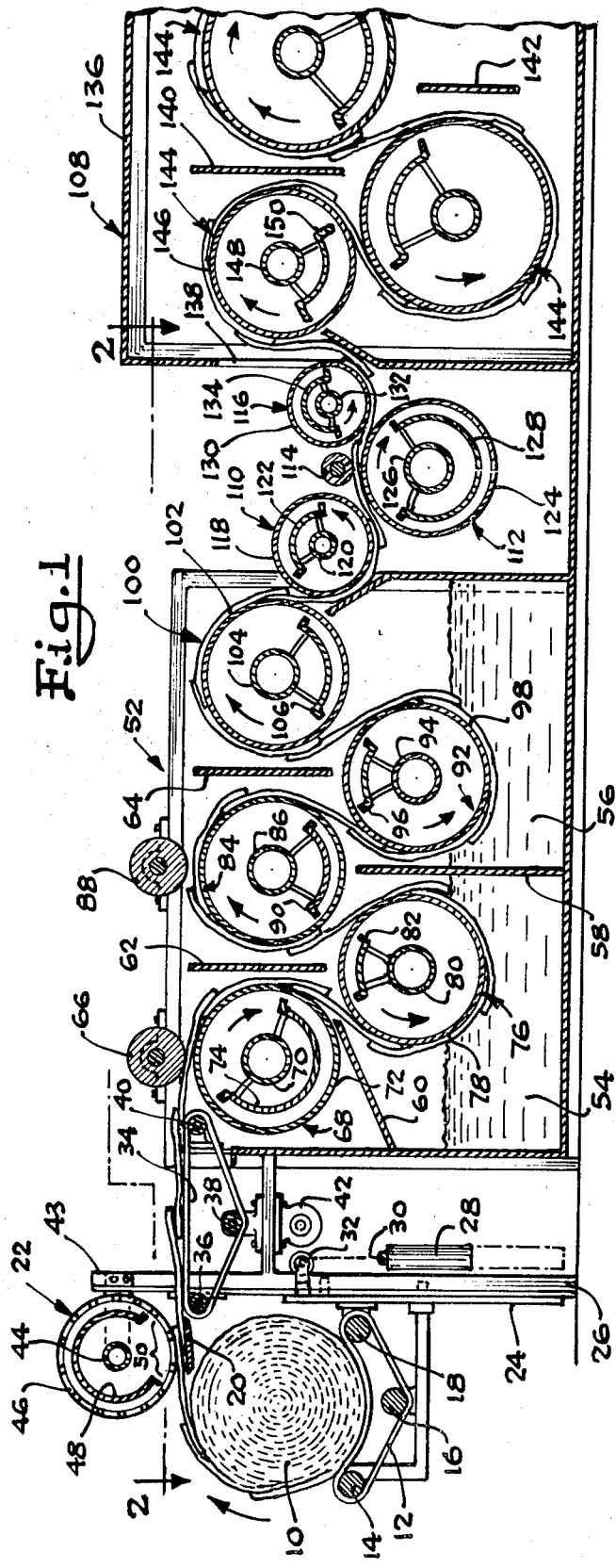
FIG. 1 is a side view, partly in section, of an apparatus schematically illustrating processing steps for use in conditioning single articles without physically joining the articles, the view further illustrating means for wetting, rinsing, drying and ironing the individual articles.

Individual articles, of the type noted above, may be taken from a mixed bundle of articles (not shown) and processed with the method and apparatus set forth herein. For example, the individual articles may be placed in roll from for convenience in handling and in this form would appear as schematically illustrated in FIG. 1 and 10. However, it should be noted that this processing step is not essential to utilization of the apparatus disclosed nor is this step essential to the process disclosed.

If the individual articles are prepared first in roll form the "winding" of the articles may be performed on devices of the type set forth in U.S. Pat. Nos. 3,314,627 or 3,315,908 relating to improved winding devices for use in rolling soft articles into roll form.

In roll form 10 the individual articles are wound in overlapping relation with a wrapper being disposed about the outer periphery of the roll to hold it in the roll form defined.

It should be noted that the roll 10 may be processed in the manner specifically disclosed and claimed in copending application Ser. No. 826,138 now set forth in issued U.S. Pat. No. 3,571,830. However, the articles also may be individually processed as disclosed herein.

The apparatus and method contemplates the processing of individual articles without joining them during processing. The processing is carried on in a substantially continuous manner with the articles successively following one another during the processing cycle so that a continuous chain of articles is defined during processing.

If the individual articles are prepared in roll form 10, as illustrated in FIG. 1, the roll will be placed upon the belt 12 of the apparatus associated with the process. The belt 12 is supported upon rolls 14, 16 and 18. One of the rolls 14, 16 or 18 may be driven to control movement of the belt 12.

The first article of the roll 10 may be positioned on a take-off table 20. A suction roll 22 is operatively mounted above the table 20 and is adapted to selectively remove each successive article from the roll 10, deposit the article on the table 20 and release it on said table.

The belt 12 and associated roll means 14, 16 and 18 are mounted on a support frame 24 which, in turn, is moveably supported on a vertical supported member 26. The support frame 24 may be mounted for movement along a track on the support member 26. The support frame 24 may be vertically oriented by means of a counter weight 28 which is connected to the frame 24 by a cord 30 which extends over the pulley 32. The counter weight 28 and associated means are arranged so that the weight of the articles comprising the roll 10 will be sufficient to lower the bundle to a position against the action of the counter weight where the upper periphery of the bundle will be in substantially the same plane as the upper surface of the take-off table 20. It can readily be seen that as the individual articles are removed from the roll 10 it will become lighter and will be elevated by action of the constant weight of the counter weight 28. Control of this action may be further regulated by the use of springs, or the like, which have variable weights depending upon the amount of extension or tension of the spring member.

It should be noted here that if the articles are to be individually fed to the table 20, the roll 10, of course, will not be utilized. The articles will instead be fed individually with some suitable means, including manual means, to the table 20 where they will be introduced to the process by the suction roll 22.

A feed belt 34 is supported on the rolls 36, 38 and 40. In the specific form of the apparatus illustrated in FIG. 1 the roll 38 is drivingly connected to the motor 42 to direct movement of the belt 34 as desired.

It should be noted that the drive motor 42 may also be connected to the roll 18, for example, to drive the belt 12 in a one- to -one relation with the belt 34. The suction roll 22 is rotatably supported on the support 42 by the outer shaft 44. The roll 22 is defined by an outer shell 46 having perforations therein extending about the entire circumference of the shell. A mask element 48 is supported by the shaft 44 and is in close-spaced proximity to the outer shell 46 to "block" the openings of the shell as noted hereinbelow. It will be seen from the schematic illustration of FIG. 1 that the mask 48 extends substantially about the inner periphery of the shell 46 except for the relatively small circumferential distance between the mask ends as shown at 50 in FIG. 1.

When the roll of articles 10 is placed on the belt 12 it will be positioned such that the upper periphery thereof will be adjacent the lower periphery of the suction roll 22. The hollow shaft 44 of the suction roll 22 is connected to an evacuating source. Air is continually withdrawn from the shaft 44 which is in evacuating communication with the interior of the roll 22 so that air is drawn from the interior thereof into the shaft 44 to the evacuating source (not shown). It can readily be seen from the illustration of FIG. 1 that the air primarily is drawn through the openings into the outer shell 46 which extend into the unmasked area 50 of the roll 22. This area is oriented such that it is at the lower peripheral portion of the roll 22 and adjacent the take-off table 20.

Figure 2:
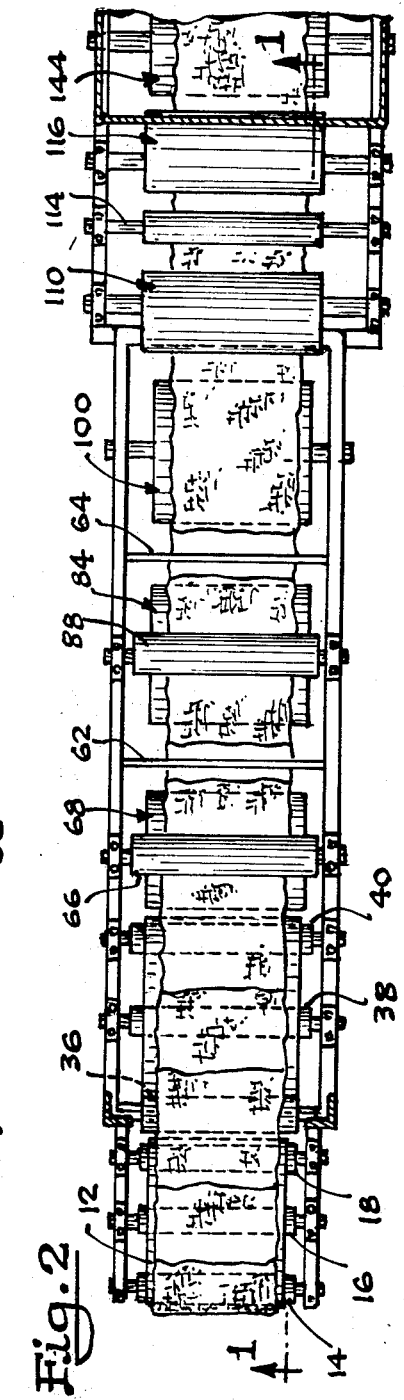
FIG. 2 is a top view of the apparatus schematically illustrated in FIG. 1.

The first article of the roll 10 is positioned on the take-off table 20 by action of the roll 22. As noted above, air is drawn through the openings in the shell 46 in the area 50. This creates a suction or low pressure area adjacent the take-off table 20 and lifts the outermost article from the roll 10 onto the table 20 and carries it along by continued rotation of the roll 22 in a counterclockwise direction. When the article extends substantially to the belt 34 it enters the masked area of the roll 22 and the suction holding the article to the roll is terminated. Accordingly, the article drops off the roll 22 and onto the belt 34 where it is carried along by rotation of said belt. A series of suction rolls having partially masked areas is provided in the rinse apparatus schematically illustrated in FIGS. 1 and 2.

It can readily be seen from the above description that the articles may be fed to the processing apparatus either individually or in roll form, as schematically represented. If the articles are washed at an earlier stage of processing, then the processing indicated here may involve only a rinsing, drying and ironing operation. However, if the articles are to be completely processed as set forth herein, then they must pass through a detergent bath or cleaning operation prior to rinsing. To this extent the apparatus for processing may be defined by a liquid container indicated generally at 52.

The liquid container 52 may be defined by a multi-compartment chamber having one compartment 54 into which a detergent solution may be placed and a second compartment 56 into which a suitable rinse solution may be placed.

The articles are fed from the belt 34 individually to the first compartment 54. As noted schematically in FIG. 1, the compartment 54 is separated from the compartment 56 by a partition 58 which isolates one compartment from the other. It should be noted further that partitions 60, 62 and 64 define upper compartmented areas within the container 52. A first roll 66 is mounted on the container 52 and is adapted to spray solution upon the articles as they pass below the roll. In one form of the use of the apparatus, the first spray roll 66 may be adapted to spray a detergent or cleaning solution upon the articles so that the cleaning operation may be initiated by this point. It should be observed, however, that if the articles have already been cleaned, then the first spray roll 66 may be adapted for use in spraying rinse solution upon the the articles to initiate the rinse action at this point.

A first suction roll 68 is mounted within the area of the container or receptacle 52 between the partitions 60 and 62. The roll 68 is rotatably mounted with respect to the hollow shaft 70. The roll 68 is defined by a perforated outer shell 72 in combination with a mask 74 which extends about a portion of the inner periphery of the perforated shell 72. The mask is adapted to isolate the perforations in the outer shell which are adjacent the mask from time-to-time. It should be observed that the masks associated with each of the suction rolls noted herein does not rotate with the outer shell. Rather, it remains stationary in substantially the position schematically illustrated in FIG. 1 of the drawings.

The shaft 70 of the roll 68 is operatively connected to a suitable vacuum source (not shown). As noted in discussion of the operation of roll 22 above, air is continually withdrawn through the hollow shaft 70 from the interior of the roll 68 and, of course, is pulled through the openings or perforations of the unmasked portions of the shell 72 of said roll. It can been from the illustration in FIG. 1 that the unmasked portions of the roll 68 extend substantially from the belt 34 to an area approximately vertically tangent with the roll 68.

A second suction roll 76 is rotatably mounted in the receptacle 52 in the area defined between the partitions 58, 60 and 62 in said receptacle. The roll 76 is defined by a perforated outer shell 78 rotatably mounted on the hollow shaft 80. A mask element 82 is supported from the shaft 80 and extends in close proximity to the inner surface of the perforated shell 78 and spans the lower terminal of the partition 62, as schematically represented in FIG. 1 of the drawings. As noted above, the mask 82 is adapted to prevent movement of air through the perforated shell in the masked area to permit the fabric to drop off, to be drawn off of the perforated shell 78.

A third suction roll 84 is rotatably mounted on the hollow shaft 86 within the receptacle 52 in the area defined between the partitions 62 and 64 and substantially above the partition 58 of the apparatus. A second spray roll 88 is rotatably mounted above the roll 84 and is adapted to dispense rinse fluid on the fabric passing over the roll 84. As schematically illustrated in FIG. 1, the rolls 68 and 84 are positioned in the upper portion of the receptacle 52 in a manner such that at least the upper most portions thereof are above the level of liquid within the areas 54 and 56 of the receptacle 52.

A mask 90 is nonrotatably mounted on the shaft 86 and extends along an area above the partition 58 of the apparatus and for several degrees along either side thereof, for reasons noted hereinbelow in description of the operation of the apparatus illustrated in the drawings.

A successive roll 92 is rotatably mounted within the receptacle 52 between the partition 58 and the right end wall of the camber 52, as schematically illustrated in FIG. 1. The roll 92 is mounted below the partition 64 and is rotatably supported on the hollow shaft 94. A mask 96 is non-rotatably supported by the shaft 94 and extends below the partition 64 of the apparatus and for several degrees along either side thereof. The roll 92 is further defined by a perforated shell 98 supported by the shaft 94. The shaft 94 is connected to a vacuum or a low pressure source (not shown). In operation, as with the other rolls noted herein, air will move through the perforations of the outer shell, to the roll interior, into the hollow shaft and to the vacuum source.

Another roll 100 is mounted within the receptacle 52 between the partition 64 and the right end wall of the receptacle 52, as schematically illustrated in FIG. 1. The roll 100 is defined by an outer perforated shell 102 rotatably supported by hollow shaft 104. A mask 106 is non-rotatably supported by the shaft 104 and extends along the lower portion of the roll 100 through an arc of about 90°, or for a distance sufficient to provide the action noted hereinbelow.

Suitable transfer means may be provided to carry articles from the receptacle to container 52 to the drier-ironer 108. The transfer means as schematically illustrated in FIG. 1 includes a plurality of rolls 110, 112, 114, and 116, all supported for rotation from a suitable frame or support means (not shown).

The roll 110 is defined by a perforated outer shell 118 rotatably supported on the hollow shaft 120 which, in turn, is connected to a vacuum source (not shown). A mask 122 is non-rotatably secured to the shaft 120 and extends about substantially the upper shaft of the roll 110 in close-spaced relation to the inner face of the perforated shell 118 of the roll to effectively block the flow of air through the drum perforations in the masked area.

The second roll of the transfer means 112 is mounted below and to the right of the first roll 110 and is defined by a perforated outer shell 124 rotatably mounted on the hollow shaft 126. A mask element 128 is non-rotatably supported by the shaft 126 and is in close-spaced proximity to the inner face of the perforated shell 124 of the roll 112. The mask 128 is adapted to prevent the movement of air through the perforations in the masked portion.

The roll 114 is mounted substantially above the roll 112 and is in relatively close-spaced relation thereto so that it will lightly engage materials moving over the top of the roll 112.

The roll 116 is mounted above and to the right of the second transfer roll 112 (FIG. 1) with the lower periphery thereof substantially aligned with a tangent extending along the upper periphery of the roll 112. The roll 116 is defined by a perforated outer shell portion 130 rotatably supported on a hollow shaft 132 and having a mask element 134 in close-spaced proximity to the inner surface of the perforated shell element 130 of the roll 116. The shaft 132, as noted above for all such rolls used in this apparatus and method, is connected to a suitable vacuum source so that air may be drawn through the performations, to the inner area of the roll and into the shaft.

The drier-ironer 108 may be enclosed by a cabinet 136 into which heated air may be introduced. The cabinet 136 is provided with an opening 138 on one end thereof to receive the individual articles to be dried within the cabinet. The drier, if desired, may be divided into a series of compartments by partitions such as those schematically illustrated at 140 and 142 in FIG. 1. A series of rolls 144 are rotatably mounted within the cabinet 136 to receive articles during operation of the apparatus. The rolls 144 each are provided with a perforated outer shell 146 rotatably mounted on a hollow shaft 148 which, in turn, is supported by the cabnet 136. The hollow shafts 148 are, in turn, connected to a suitable vacuum or low pressure source.

Each of the rolls 144 is further provided with a mask element 150 which is non-rotatably supported on the shafts 148 and extend in close-spaced proximity to the inner surface of the perforated shells 146. The masks 150 are adapted to prevent the passage of air through the perforated outer shell elements 146 in the masked area.

OPERATION

The process will be described herein and the use of the apparatus set forth will be characterized in conjunction with the processing of single articles in a substantially continuous process without the attendant need for physically joining the articles for processing. Articles of the type suggested may be table napkins, hand towels, table cloths or similar articles.

As noted above, the individual soiled articles are taken from a storage container in which they are randomly, loosely deposited. The articles may then be rolled into the form schematically illustrated at 10 in FIG. 1 for convenience in processing or may be processed individually, as desired.

In the processing sequence with the apparatus schematically illustrated herein the roll 10 will be placed on the belt 12 for separation of the individual articles forming the roll 10. The belt 12 is rotated and the first article on the outside of the roll will be placed on the take-off table 20. The first article is captured by air moving through the perforated outer shell 46 of the suction roll 22. The article moves against the outer shell 46 to be captured by movement of air through the shell 46 which occurs only in that portion of the shell moving between the free ends of the mask 48 of the roll 22. Accordingly, the lead end of the article will drop off of the roll 22 after it passes the right terminal of the mask, as schematically illustrated in FIG. 1. The forward momentum of the article will carry it on to the conveyor belt 34 where it will be carried along by movement of the conveyor belt itself. It can readily be seen that individual articles may be processed in this manner by simply placing the lead end of the article on the table 20 and laying each successive article on the tail end of the next preceeding article to form a substantially continuous, unjoined chain of individual articles.

Each successive article is placed in overlapped relation on the preceeding article so that a continuous chain of articles is defined in overlapped relation with the articles not being physically joined at any stage during processing, as noted herein.

The successive lead ends of the articles will be carried along by the underlying tail end of the preceeding article. The lead end of each successive article is caught first by the suction roll 22 and then is carried along to the conveyor belt 34, as described above. In this manner the articles are continuously fed to the apparatus in a successive chain.

If the articles are being processed in roll form (10) the belt 12 will continue to move upwardly as the roll 10 becomes smaller by removal of successive articles therefrom. This action keeps the articles in the desired relation to the table 20 and suction roll 22 so that each successive lead end of the articles will be deposited on the perforated sell 48 by movement of air through said shell.

The articles remain in overlapped relation during the remainder of the process in sequence described herein to provide for successive transfer of articles from station-to-station for processing.

The articles are fed from the belt 34 to the cleaning or detergent bath 54. As schematically represented in FIG. 1, the roll 68 is mounted such that the perforated outer shell 72 thereof is in close-spaced proximity to the end conveyor belt 34. As the lead end of the articles drop off of the conveyor belt 34 they will be attracted to the outer shell 72 of the roll 68 by reason of the air flow though the perforated shell 72 from the outside to the inside of said shell. As noted hereinabove with respect to each of the suction rolls, the air will move through the perforated shell to the interior thereof and then into the hollow shaft to a vacuum source. Continuous movement of air is provided so that the articles will be attracted to and held against the outer surface of the shells in the portion thereof not covered by the masks.

In the stage noted above, the articles move onto the shell 72 after dropping off of the belt 34 and are held by the shell throughout the entire movement along the unmasked portion of movement of the shell. As schematically illustrated in FIG. 1, the articles are carried along to a vertical position on the shell 72. As they reach the lower vertical position of movement they begin to move over the beginning portion of the masked area and will drop off of the shell 72 onto the shell 78 of roll 76. The unmasked portion of roll 76 is in close-spaced relation to the roll 68 so that the articles will be caught by the air moving along and through the shell 78 of the roll 76.

Spray means may be added to the apparatus, as schematically illustrated in FIG. 1 at 66. Such spray means may be adapted to direct a detergent solution or cleaning solution onto the articles as they pass beneath the spray roll. The liquid from the spray means will be carried through the article by the air movement and will assist in removal of dirt, grease, or other undesirable foreign material from the articles. The evacuating apparatus used in conjunction with the rolls should be of the type capable of handling liquids during the evacuation operation.

The articles are held against the outer surface of the perforated shell 78 of roll 76 and will pass through the detergent bath or cleaning bath where they will be further cleaned to remove foreign material from the articles being processed. As the articles are moved through the cleaning or detergent bath liquid will be drawn through the articles and into the interior of the roll 76 by reason of the fact that a lower pressure is maintained within the interior of the roll than the pressure acting upon the surface of the liquid in the cleaning area 54.

It should be noted that the articles may be moved slowly through the cleaning bath so that they will be held tightly against the outer surface of the perforated shell of the rolls as they are carried through the bath. If this condition is not maintained, the lead end of the articles may be pulled away from the surface of the roll thereby giving rise to a condition where the articles may be lifted from the roll and dropped to the bottom of the receptacle 54. However, if the rolls are moved slowly the liquid adjacent to the articles as they move through the rinse bath will pass through the articles and into the rolls rather than passing forceably along the articles.

As noted above, if the articles are previously processed for removal of foreign material therefrom, the bath 54 may be a rinse bath rather than a cleaning or detergent bath.

The articles are carried along on the surface of the roll 76 to a position where the mask 82 blocks passage of air through the perforated outer shell 78 of the roll 76. At this point the third roll 84 is in close-spaced relation to the roll 76. Accordingly, the unmasked area of the roll 84 will attract the articles in preference to the masked area of the roll 76. In this way the articles are transferred from the outer surface of the roll 76 to the outer surface of the roll 84 for further processing.

As the articles are moved along on the surface of the roll 84 during rotation thereof they pass beneath a second spray roll 88. This spray roll may be adapted to direct a stream of rinse liquid against the articles. The rinse liquid is drawn through the articles and to the interior of the roll 84. In this way soil or other foreign materials entrapped in the fabric defining the articles will be loosened and removed from the articles.

The articles then are carried along on the outer surface of the roll 84 to an area adjacent to the mask 90 associated with said roll. At this point the roll 92 is in close-spaced relation to the roll 84 and the articles are trasnferred from the roll 84 to the outer surface of the roll 92. The articles are carried along on the outer surface of the roll 92 through the rinse bath in the area 56 to provide for immersion in said bath. The function of this bath is to further rinse the articles to remove the cleaning fluid or detergent from the articles and to remove any remaining soil or foreign particles that may be captured within the fabric of the articles.

The articles then are carried along on the surface of the roll 92 to the beginning of the masked area 96 where they are transferred to the unmasked portion of the roll 100 where a substantial amount of the liquid carried by the articles is removed by the passage of air through the fabric. The air, of course, will force the liquid out of the fabric and into the center of the roll 100. The articles are then transferred from the suction roll 100 to the suction roll 110, over roll 112 and onto the outer surface of the roll 116. These rolls are adapted to transfer the articles from the rinse area 56 to the drier-ironer 108. It should be noted that any suitable transfer means may be provided for moving the articles from one mechanism to the other. The roll apparatus illustrated here is for purpose of illustration of the invention and process contemplated by the inventor and is not intended as restrictive as to the means for transfer of articles from one stage of processing to the other. For example, a conveyor may be used such as that shown for transfer of articles from the roll 22 to the first liquid processing area 54 of the apparatus.

The articles are moved from the last transfer roll 116 onto the first roll 144 of the drier-ironer 108. The articles are carried along on the smooth-perforated outer surface 146 of the first roll 144. Heated air is injected into the chamber of the drier-ironer 108. The heated air, of course, is drawn through the articles and through the perforated outer shell 146 of the first roll 144 where it then passes along the hollow shaft 148 to the vacuum source (not shown).

The temperature of the air within the cabinet 136 should be sufficiently high to provide for rapid evaporation of liquid and to dry the fabric defining the articles. Also, the movement of air should be at a sufficiently high velocity to forceably draw the articles against the smooth outer surface of the shell 146 so that the articles will assume the flat transverse definition of the shell and have an ironed appearance when they emerge from the drier-ironer 108.

As schematically illustrated in FIG. 1, the articles are transferred to subsequent rolls 144 to be carried along the perforated outer shells associated with said rolls for complete drying and smoothing of the fabric defining the articles. In this manner a sufficient time period may be provided for the desired action within the cabinet 136. It should be noted that the drying rate is a function of the temperature of air passing through the fabric and the time in the cabinet may be varied, in part, by the air temperature.

I have described only one method of processing individual articles in a substantially continuous fashion without physically joining the articles for processing. Other means may be devised for physically accomplishing the processing specifically disclosed herein without departing from the substance of the invention disclosed.

It should be observed that chambers in addition to those schematically illustrated at 54 and 56 may be provided for successive treatment of the liquid either into the cleaning or rinse stage to assure complete processing of the articles, as desired. Additional chambers may be constructed in substantially the modular fashion schematically illustrated in FIG. 1 by the addition of the chambers and the suction rolls associated therewith.

While I have shown and described a specific embodiment of the present invention it will, of course, be understood that other modifications may be used without departing from the true spirit and scope of this invention. I therefore intend by the appended claims to cover all such modifications as fall within their true spirit and scope.

What I claim as new and desire to secure as Letters Patent of the United States, is:

1. A method for continuously processing discrete articles without joining same, the method comprising the steps of:
   selecting individual articles and disposing them such that they may be attracted by a first suction means;
   transporting the articles individually by movement of the first suction means to a liquid processing stage for treatment of the article;
   sequentially passing the articles along to successive suction means by terminating the suction on each said suction means in the processing area where the article is disposed adjacent the next succeeding suction means so that the next succeeding suction means attracts the articles sequentially to move it along; and
   moving the articles with said suction means from the liquid processing stage to and through drying means wherein additional suction means are provided, said additional suction means having smooth surfaces to define a finished ironed appearance on each article as it passes from the drying means.

2. The method of claim 1 wherein each of the suction means is defined by a roll having a perforated outer shell wherein fluid may be drawn from the exterior to the interior of the shell to hold the individual articles on the surface of the perforated outer shell.

3. The method of claim 2 wherein the suction means are provided with masked areas to prevent passage of fluid from the exterior to the interior of the shell in said areas and provide means for transfer of articles from one said suction means to a successive suction means by pre-determined termination of suction adjacent the successive suction means.

4. The method of claim 1 wherein the liquid processing means includes cleaning means and wherein cleaning liquid is passed through the article during processing to remove foreign material from the article, the cleaning liquid passing through the article, through the shell and into the interior of the roll.

5. The method of claim 1 wherein hot, dry air is employed in the drying means to evaporate liquid from the articles as they pass through the drying means and wherein the suction means in said drying means are provided with smooth surfaces so that as the articles are pressed against the smooth surfaces by passage of hot, dry air there-through into the interior of the roll the articles will assume the flat surface characteristic of the smooth roll surface and be given an ironed appearance without further pressing.

6. The method of claim 1 wherein the articles are processed sequentially by overlapping adjacent article ends to define a continuous chain of material as the articles pass sequentially through the process.

* * * * *